United States Patent
Hsu et al.

(10) Patent No.: US 10,404,934 B2
(45) Date of Patent: Sep. 3, 2019

(54) ANALOG-TO-DIGITAL SIGNAL PROCESSING METHOD AND APPARATUS FOR IMAGE SENSOR

(71) Applicant: PixArt Imaging Inc., Hsin-Chu (TW)

(72) Inventors: Cheng-Seng Hsu, Hsin-Chu (TW); Jui-Te Chiu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 297 days.

(21) Appl. No.: 15/434,035

(22) Filed: Feb. 15, 2017

(65) Prior Publication Data

US 2018/0103224 A1    Apr. 12, 2018

(30) Foreign Application Priority Data

Oct. 7, 2016    (TW) .............................. 105132467 A

(51) Int. Cl.
*H04N 5/378*    (2011.01)

(52) U.S. Cl.
CPC .................................. *H04N 5/378* (2013.01)

(58) Field of Classification Search
CPC ...... H04N 5/378; H04N 5/374; H04N 5/3745; H04N 5/37452; H04N 5/37455; H03M 1/123; H03M 1/56; H03M 1/1245
See application file for complete search history.

(56) References Cited

U.S. PATENT DOCUMENTS

| | | | | |
|---|---|---|---|---|
| 7,479,916 B1* | 1/2009 | Reshef | ................ | H03M 1/123 341/169 |
| 8,698,928 B2* | 4/2014 | Mishina | ............... | H04N 5/3742 348/302 |
| 8,953,074 B2* | 2/2015 | Nomura | ............... | H04N 5/3454 250/208.1 |
| 2001/0020909 A1* | 9/2001 | Sakuragi | ............. | H03M 1/1225 341/139 |
| 2012/0038809 A1* | 2/2012 | Lee | ...................... | H04N 5/3575 348/308 |
| 2012/0039548 A1* | 2/2012 | Wang | ................... | H03M 1/1009 382/312 |
| 2014/0077057 A1* | 3/2014 | Chao | ................. | H01L 27/14634 250/208.1 |
| 2016/0028974 A1* | 1/2016 | Guidash | ............. | H04N 5/37455 348/294 |
| 2016/0150171 A1* | 5/2016 | Raynor | .................. | H04N 5/345 348/302 |
| 2016/0234451 A1* | 8/2016 | Otaka | .................... | H04N 5/378 |
| 2017/0280079 A1* | 9/2017 | Fu | ......................... | G06F 1/3234 |
| 2017/0302869 A1* | 10/2017 | Ikuma | .................... | H04N 5/365 |

\* cited by examiner

*Primary Examiner* — Chia Wei A Chen
(74) *Attorney, Agent, or Firm* — Winston Hsu

(57) ABSTRACT

An analog-to-digital signal processing method applied for an image sensor includes: providing a global analog-to-digital converter (ADC) capable of converting analog signals of all pixels of a pixel array into digital signals; providing a column-parallel ADC capable of respectively converting a plurality of analog signals of a plurality of pixels on different columns of the pixel array into a plurality of digital signals by using a plurality of ADC circuits; and, dynamically selecting and switching to enable one of the global ADC and column-parallel ADC to perform analog-to-digital conversion for analog data/signals of pixels on the pixel array.

11 Claims, 1 Drawing Sheet

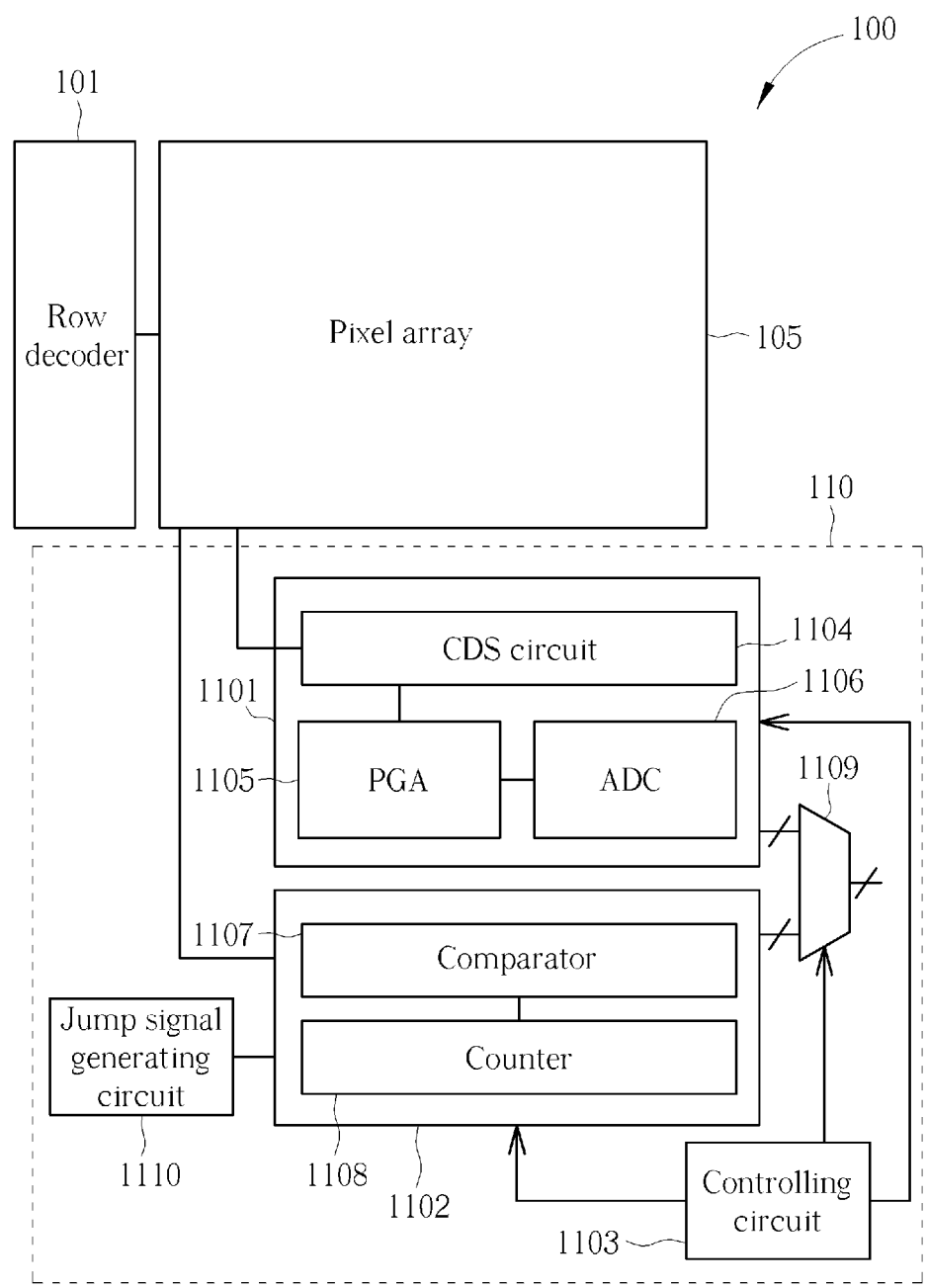
FIGURE

ANALOG-TO-DIGITAL SIGNAL PROCESSING METHOD AND APPARATUS FOR IMAGE SENSOR

BACKGROUND OF THE INVENTION

1. Field of the Invention

The invention relates to an analog-to-digital signal processing scheme, and more particularly to an analog-to-digital signal processing method and a corresponding apparatus used in an image sensor.

2. Description of the Prior Art

Generally speaking, the type of a conventional analog-to-digital converter (ADC) circuit used in an image sensor can be one of the global ADC and column-parallel ADC. The global ADC uses a single one ADC circuit to perform an ADC operation for the analog signals generated by all the pixels (or pixel units) on a pixel array of the image sensor. The column-parallel ADC uses multiple ADC circuits to respectively perform each ADC circuit to perform an ADC operation for the analog signals generated by pixels at a corresponding column of the pixel array so as to achieve the ADC operation.

The global ADC can provide the advantages of power saving and lower power consumption since the global ADC merely employs and enables the single one ADC circuit to perform the ADC operation. The disadvantage of the global ADC is that the global ADC processes the analog signals with a low processing speed, and thus it is only suitable for a small-size pixel array. However, the currently-developed image sensor is usually designed with a higher resolution and accordingly needs to employ a larger-size pixel array including more pixels. Usually, the column-parallel ADC is applied into the currently-developed image sensor to use the multiple ADC circuits to respectively perform each ADC circuit to perform an ADC operation for the analog signals generated by pixels at a corresponding column of the pixel array so as to achieve the ADC operation. However, it is evitable that the column-parallel ADC consumes more power since the column-parallel ADC needs to activate the multiple ADC circuits during the activated/turned-on time period for one frame. Using the column-parallel ADC for performing ADC operation does not meet the power saving requirement of the currently-developed portable electronic device.

SUMMARY OF THE INVENTION

Therefore one of the objectives of the invention is to provide a novel analog-to-digital signal processing method and corresponding apparatus used in an image sensor to be capable of dynamically selecting and switching to enable an ADC consuming less power to perform ADC operation or enable an ADC with a high processing speed to perform ADC operation based on different sensing requirements/conditions, so as to solve the above-mentioned problems.

According to the embodiments of the invention, an analog-to-digital signal processing method applied for an image sensor is disclosed. The analog-to-digital signal processing method comprises: providing a global ADC capable of converting a plurality of analog signals of all pixels of a pixel array into a plurality of digital signals; providing a column-parallel ADC capable of respectively converting a plurality of analog signals of a plurality of pixels on different columns of the pixel array into a plurality of digital signals by using a plurality of ADC circuits; and, dynamically selecting and switching to enable one of the global ADC and the column-parallel ADC to perform an analog-to-digital conversion for data of pixels on the pixel array.

According to the embodiments, an analog-to-digital signal processing apparatus used in an image sensor is disclosed. The analog-to-digital signal processing apparatus comprises a global ADC, a column-parallel ADC, and a controlling circuit. The global ADC is capable of converting a plurality of analog signals of all pixels of a pixel array of the image sensor into a plurality of digital signals. The column-parallel ADC is capable of respectively converting a plurality of analog signals of a plurality of pixels on different columns of the pixel array into a plurality of digital signals by using a plurality of ADC circuits. The controlling circuit is coupled to the global ADC and the column-parallel ADC, and is configured for dynamically selecting and switching to enable one of the global ADC and the column-parallel ADC to perform an analog-to-digital conversion for data of pixels on the pixel array.

These and other objectives of the present invention will no doubt become obvious to those of ordinary skill in the art after reading the following detailed description of the preferred embodiment that is illustrated in the various FIGURES and drawings.

BRIEF DESCRIPTION OF THE DRAWINGS

FIGURE is a diagram of an image sensor according to an embodiment of the invention.

DETAILED DESCRIPTION

Refer to FIGURE, which is a diagram of an image sensor 100 according to an embodiment of the invention. The image sensor 100 comprises a row decoder 101, a pixel array 105, and an analog-to-digital signal processing apparatus 110. The analog-to-digital signal processing apparatus 110 comprises a global analog-to-digital converter (ADC) 1101, column-parallel ADC 1102, and a controlling circuit 1103. The global ADC 110 for example includes a correlated double sampling (CDS) circuit 1104, a programmable gain amplifier (PGA) 1105, and a single ADC circuit 1106. The column-parallel ADC 1102 includes a comparator circuit 1107 and a counter circuit 1108. Both the output of global ADC 1101 and the output of column-parallel ADC 1102 are coupled to two inputs of a multiplexer 1109. In addition, the column-parallel ADC 1102 is further coupled to a ramp signal generating circuit 1110.

The image sensor 100 for example is a CMOS image sensor (but not limited). The pixel array 105 for example includes M*N pixels (or called pixel units) wherein M means M rows and N means columns. Values of M and N are not limitations of the invention. M*N pixels also indicate the resolution of the image results of the image sensor 100. Pixels on the pixel array 105 are exposed one by one to sense images during an activated/turned-on time period of one frame. The row decoder 101 is arranged for controlling the exposure of pixel units at a particular row of the pixel array 105 to generate sensed signals. The Analog-to-digital signal processing apparatus 110 is arranged for performing ADC operation upon the sensed signals to convert an analog signal corresponding to each pixel into a digital signal when image sensor 100 performs the image sensing operation and to provide the digital signal for the back-end digital signal processing (DSP) circuit so that the back-end DSP circuit can process the digital signal. The ADC scheme in the embodiment is arranged to employ the controlling circuit 1103 to adaptively deciding and selecting one of the global ADC 1101 and column-parallel ADC 1102 to perform the ADC operation in different situations, to save power as much as possible for the image sensor 100.

A global ADC for example including only a single one ADC circuit needs more time to process analog signals of the pixels but can save more power. A column-parallel ADC for example including multiple sets of ADC circuits does not need too much time to process the analog signals of the pixels but consumes more power. In the embodiment, the controlling circuit 1103 is arranged to dynamically turn on one of the above-mentioned two ADCs and turn off the other according to different sensing conditions/situations. Thus, the global ADC can be turned on and column-parallel ADC can be turned off to process analog signals of pixel units when the number of the pixel units, to be processed during one activated/turned-on time period of one frame, is smaller. In addition, the column-parallel ADC can be turned on and global ADC can be turned off to process analog signals of the pixel units when the number of the pixel units, to be processed during one activated/turned-on time period of one frame, is larger. That is, the image sensor 100 can selectively switches and/or enables ADCs corresponding different extents of power consumption, and does not need to always turn on an ADC which consumes more power to perform an ADC operation. Accordingly, the image sensor 100 can dynamically switch to enable/employ a different ADC to process analog signals when a different application program is executed. For example, if some application program merely needs to detect images of a smaller pixel area without detecting images of all pixels on the pixel array 105, then the image sensor 100 can be arranged to activate partial pixels to perform image detection and select/enable one ADC which consume less power to perform ADC operation.

The global ADC 1101 is arranged to convert a plurality of analog signals of all pixels on the pixel array 105 of image sensor 100 into a plurality of digital signals one by one. The global ADC 1101 performs the above operation by using a correlated double sampling (CDS) circuit 1104 to sample the analog signals to reduce fixed pattern noise and/or reset noise, then using the PGA 1105 to perform signal amplifying operation upon the sampled analog signals, and then using the ADC 1106 to perform ADC operation upon the amplified analog signals to generate the digital signals to the back-end circuit.

The column-parallel ADC 1102 is arranged for respectively converting a plurality of analog signals of a plurality of pixels at different columns of the pixel array 105 by using a plurality of different ADC circuits each performing ADC operation upon a plurality of analog signals of a plurality of pixels at a different column one by one. In practice, the ADC circuits in the embodiment can be implemented by using a plurality of corresponding comparator circuits, counters, and a jump signal generating circuit which can generate a plurality of jump signals. As shown in FIGURE, the comparator 1107 comprises multiple sets of comparator circuits each corresponding to a plurality of pixels at one corresponding column. The counter circuit 1108 comprises multiple counter circuits each corresponding to the pixels at one corresponding column. The jump signal generating circuit 1110 is coupled to the multiple sets of comparator circuits of comparator 1107 and is used for generating a plurality of different jump signals to the different comparator circuits correspondingly wherein the different jump signals are respectively generated and correspondingly controlled by the different counter circuits of counter circuit 1108.

It should be noted that the embodiment aims at providing the ADC scheme capable of dynamically and selectively enabling one of two different type ADCs according to different sensing requirements and/or conditions, to avoid much power consumption due to that merely a single one column-parallel ADC is used for ADC operation. Different embodiments or types of ADCs can be applied for the ADC scheme mentioned above. The embodiments of global ADC 1102 and column-parallel ADC 1102 mentioned above are used as examples for illustrative purposes and are not meant to be limitations of the invention.

The controlling circuit 1103 is coupled to the global ADC 1101 and column-parallel ADC 1102 and is used for dynamically switch and enable one of the global ADC 1101 and column-parallel ADC 1102 to perform an ADC operation upon the analog signals of a plurality of signals on the pixel array 105. If a pixel or a pixel unit is not turned on to sense image during one sensing time period, then no analog sensed signals are generated. The data of the pixels mentioned above means the data of activated/turned-on pixels during one sensing time period.

Specifically, the controlling circuit 1103 is arranged to detect the number of currently turned on pixels on the pixel array 105 and selectively switch to activate or enable one of the global ADC 1101 and column-parallel ADC 1102 according to the total number of the currently turned on pixels. The number of the currently turned on pixels on the pixel array 105 does not certainly mean the number of total M*N pixels on the whole pixel array 105, and it means the number of activated/turned-on pixels on the pixel array 105 during one sensing time period. For example, if the total M*N pixels are turned on, then the number of the activated/turned-on pixels is equal to the number of the total M*N pixels. The number of the activated/turned-on pixels also represents the size of an effective pixel region on the pixel array 105.

If determining that the number of the currently turned on pixels is smaller than or equal to a predetermined threshold number, then the controlling circuit 1103 is arranged to decide to enable the global ADC 1101 to employ the global ADC 1101 to perform the ADC operation upon the analog signals of the currently turned on pixels on the pixel array 105 and to disable the column-parallel ADC 1102. The image sensor 100 accordingly can save more power in this situation. Instead, if determining that the number of the currently turned on pixels is larger than the predetermined threshold number, then the controlling circuit 1103 is arranged to decide to enable the column-parallel ADC 1102 to employ the column-parallel ADC 1102 to perform an ADC operation upon the analog signals of the currently turned on pixels on the pixel array 105 and to disable the global ADC 1101.

Thus, when the number of the currently turned on pixels on the pixel array 105 is not larger than the predetermined threshold number, the controlling circuit 1103 can appropriately enable and employ the global ADC 1101 which consume less power to perform an ADC operation. When the number of the currently turned on pixels on the pixel array 105 is larger than the predetermined threshold number, the controlling circuit 1103 can appropriately enable and employ the column-parallel ADC 1102 which processes analog signals more rapidly to perform an ADC operation so that the wait time period for signal conversion can be reduced. This can achieve power saving and higher signal processing speed in response to different sensing requirements/conditions. Compared to some conventional scheme that uses a column-parallel ADC operation in all situations, the ADC scheme in the embodiment can decide to enable/activate the global ADC 1101 which consumes less power to perform an ADC operation when the number of the currently turned on pixels is not larger than the predetermined threshold number. Thus, it is not required to always turn on or enable the multiple ADC circuits of the column-parallel ADC 1102 in all situations. Due to this, the image sensor can save more power.

Furthermore, in other embodiments, in the above steps of dynamically switch and select one of the global ADC 1101 and column-parallel ADC 1102, the controlling circuit 1103 can be arranged to switch and/or decide to enable one of the global ADC 1101 and column-parallel ADC 1102 according to the total number of the currently activated/turned-on pixels at a certain column of the pixel array 105, i.e. activated pixel counts of a column. For example, when the total number of the currently activated/turned-on pixels at the certain column is smaller than or equal to a predetermined threshold number, the controlling circuit 1103 can decide to enable the global ADC 1101 to perform an ADC operation upon the analog signals of the pixels of the pixel array 105. When the total number of the currently activated/turned-on pixels at the certain column is larger than the predetermined threshold number, the controlling circuit 1103 can decide to enable the column-parallel ADC 1102 to perform an ADC operation upon the analog signals of the pixels of the pixel array 105.

Further, in other embodiments, the controlling circuit 1103 can be arranged to switch and/or decide to enable one of the global ADC 1101 and column-parallel ADC 1102 according to both the total number of the currently activated/turned-on pixels at a certain column of the pixel array 105 and the number of totally activated/turned-on pixels on the pixel array 105.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An analog-to-digital signal processing method applied for an image sensor, comprising:
   providing a global analog-to-digital converter (ADC) capable of converting a plurality of analog signals of all pixels of a pixel array into a plurality of digital signals;
   providing a column-parallel ADC capable of respectively converting a plurality of analog signals of a plurality of pixels on different columns of the pixel array into a plurality of digital signals by using a plurality of ADC circuits; and
   dynamically selecting and switching to enable one of the global ADC and the column-parallel ADC to perform an analog-to-digital conversion for data of pixels on the pixel array.

2. The analog-to-digital signal processing method of claim 1, wherein the step of dynamically selecting and enabling one of the global ADC and the column-parallel ADC comprises:
   dynamically selecting and switching to enable one of the global ADC and the column-parallel ADC according to a total number of currently activated pixel(s) on the pixel array.

3. The analog-to-digital signal processing method of claim 2, wherein:
   selecting and switching to enable the global ADC to perform the analog-to-digital conversion for the data of the pixels on the pixel array when the total number is smaller than or equal to a predetermined threshold number; and
   selecting and switching to enable the column-parallel ADC to perform the analog-to-digital conversion for the data of the pixels on the pixel array when the total number is larger than the predetermined threshold number.

4. The analog-to-digital signal processing method of claim 1, wherein the step of dynamically selecting and switching to enable one of the global ADC and the column-parallel ADC comprises:
   selecting and switching to enable one of the global ADC and the column-parallel ADC according to a total number of currently activated pixels at a specific column of the pixel array.

5. The analog-to-digital signal processing method of claim 4, wherein:
   selecting and switching to enable the global ADC to perform the analog-to-digital conversion for the data of the pixels on the pixel array when the total number of the currently activated pixels at the specific column is smaller than or equal to a predetermined threshold number; and
   selecting and switching to enable the column-parallel ADC to perform the analog-to-digital conversion for the data of the pixels on the pixel array when the total number of the currently activated pixels at the specific column is larger than the predetermined threshold number.

6. An analog-to-digital signal processing apparatus used in an image sensor, comprising:
   a global analog-to-digital converter (ADC), capable of converting a plurality of analog signals of all pixels of a pixel array of the image sensor into a plurality of digital signals;
   a column-parallel ADC capable of respectively converting a plurality of analog signals of a plurality of pixels on different columns of the pixel array into a plurality of digital signals by using a plurality of ADC circuits; and
   a controlling circuit, coupled to the global ADC and the column-parallel ADC, configured for dynamically selecting and switching to enable one of the global ADC and the column-parallel ADC to perform an analog-to-digital conversion for data of pixels on the pixel array.

7. The analog-to-digital signal processing apparatus of claim 6, wherein the controlling circuit is arranged for dynamically selecting and switching to enable one of the global ADC and the column-parallel ADC according to a total number of currently activated pixels on the pixel array.

8. The analog-to-digital signal processing apparatus of claim 7, wherein:
   the controlling circuit is arranged for selecting and switching to enable the global ADC to perform the analog-to-digital conversion for the data of the pixels on the pixel array when the total number is smaller than or equal to a predetermined threshold number; and
   the controlling circuit is arranged for selecting and switching to enable the column-parallel ADC to perform the analog-to-digital conversion for the data of the pixels on the pixel array when the total number is larger than the predetermined threshold number.

9. The analog-to-digital signal processing apparatus of claim 6, wherein the controlling circuit is arranged for selecting and switching to enable one of the global ADC and the column-parallel ADC according to a total number of currently activated pixels at a specific column of the pixel array.

10. The analog-to-digital signal processing apparatus of claim 9, wherein:

the controlling circuit is arranged for selecting and switching to enable the global ADC to perform the analog-to-digital conversion for the data of the pixels on the pixel array when the total number of the currently activated pixels at the specific column is smaller than or equal to a predetermined threshold number; and the controlling circuit is arranged for selecting and switching to enable the column-parallel ADC to perform the analog-to-digital conversion for the data of the pixels on the pixel array when the total number of the currently activated pixels at the specific column is larger than the predetermined threshold number.

11. An image sensor, comprising:

a pixel array;

a global analog-to-digital converter (ADC), capable of converting a plurality of analog signals of all pixels of the pixel array into a plurality of digital signals;

a column-parallel ADC capable of respectively converting a plurality of analog signals of a plurality of pixels on different columns of the pixel array into a plurality of digital signals by using a plurality of ADC circuits; and a controlling circuit, coupled to the global ADC and the column-parallel ADC, configured for dynamically selecting and switching to enable one of the global ADC and the column-parallel ADC to perform an analog-to-digital conversion for data of pixels on the pixel array.

* * * * *